United States Patent [19]

Sugimoto

[11] Patent Number: 4,675,802

[45] Date of Patent: Jun. 23, 1987

[54] THREE-PHASE-TO-THREE-PHASE POWER CONVERTER

[75] Inventor: Hidehiko Sugimoto, Hyogo, Japan

[73] Assignee: Mitsubishi Denki Kabushiki Kaisha, Tokyo, Japan

[21] Appl. No.: 824,253

[22] Filed: Jan. 30, 1986

[30] Foreign Application Priority Data

Jan. 31, 1985 [JP] Japan .................................. 60-17565

[51] Int. Cl.$^4$ ............................................. H02M 5/00
[52] U.S. Cl. ..................................... 363/164; 363/41; 363/165
[58] Field of Search ................. 363/41, 160, 161, 163, 363/164

[56] References Cited

U.S. PATENT DOCUMENTS 4,349,867  9/1982  Otsuka et al. ...................... 363/164

OTHER PUBLICATIONS

Ziogas et al., "Some Improved Forced Commutated Cycloconverter Structures", IEEE, 1984.

Primary Examiner—Peter S. Wong
Assistant Examiner—Anita M. Ault
Attorney, Agent, or Firm—Bernard, Rothwell & Brown

[57] ABSTRACT

A 3-phase-to-3-phase power converter is intended to control the output voltage and current so as to provide a 3-phase sinusoidal wave which is controlled in compliance with the input voltage. The main circuit has a switching period shorter than 30° of the power voltage waveform and it is controlled so that switching of lines takes place in alternate fashion, whereby the input power factor is improved.

3 Claims, 16 Drawing Figures

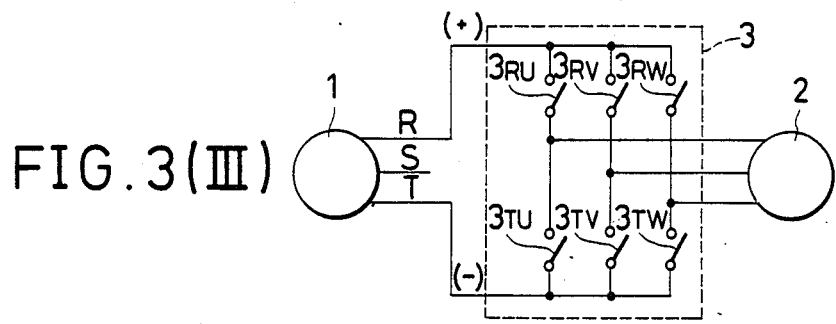
FIG.3(III)

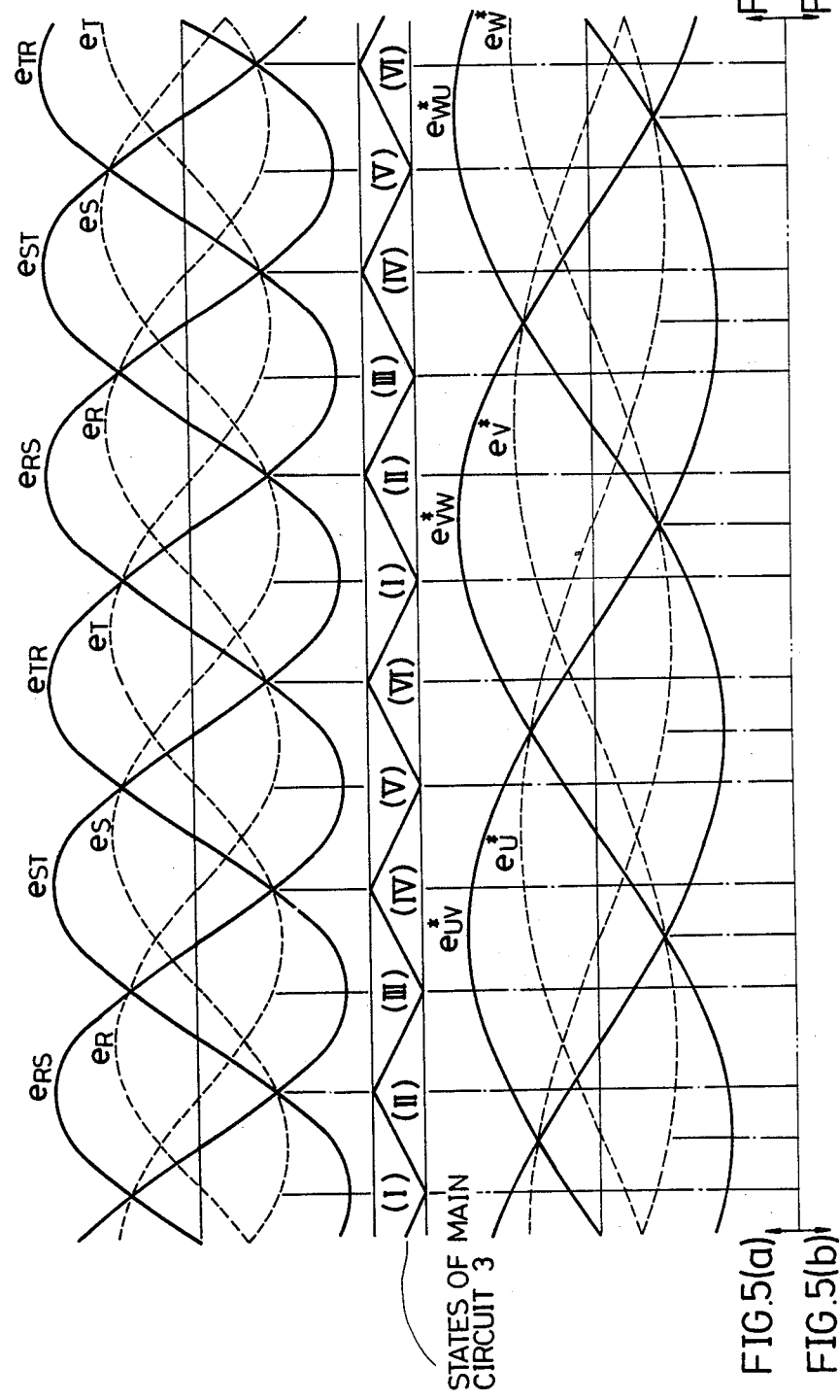

FIG.5(b)

THREE-PHASE-TO-THREE-PHASE POWER CONVERTER

BACKGROUND OF THE INVENTION

1. Field of the Invention

The present invention relates to a 3-phase-to-3-phase power converter and, particularly to a power converter using switching devices controlled in conductive or nonconductive mode.

2. Description of the Prior Art

There has been proposed this kind of a power converter as shown in FIG. 1. The figure shows in a brief block diagram the conventional 3-phase-to-3-phase power converter disclosed in the proceeding of IEEE, Vol. 125, No. 7, July 1978, pp. 643–647, "APPLICATION OF POWER TRANSISTORS TO POLYPHASE REGENERATIVE POWER CONVERTERS". The circuit structure shown in FIG. 1 includes a power source 1 which provides 3-phase (R, S, T) voltages eR, eS and eT, a 3-phase load 2, e.g., a motor, and a main circuit 3 located between the power source 1 and load 2. The main circuit 3 consists of switches 3RU, 3RV, 3RW, 3SU, 3SV, 3SW, 3TU, 3TV, and 3TW that are made conductive selectively so that a 3-phase sinusoidal current is supplied to the load 2. The arrangement further includes a 3-phase current commander 4 which produces a U-phase current command iU*, V-phase current command iV* and W-phase current command iW* for the load 2, three current sensors 5U, 5V and 5W which detect a U-phase current iU, V-phase current iV and W-phase current iW of the load 2, three current controllers 6U, 6V and 6W provided for the U, V and W phases for determining the conductive or nonconductive states of the switches 3RU, 3SU and 3TU; 3RV, 3SV and 3TV; and 3RW, 3SW and 3TW, respectively, a decoder 7 which determines the conductive or nonconductive states of the switches 3RU, 3RV, 3RW; 3RV, 3SU, 3SV; and 3SW, 3TU, 3TV, 3TW in accordance with the voltage condition of the power source 1, and three decoders 8U, 8V and 8W provided for the U, V and W phases for determining the conductive or nonconductive states of the all switches in the main circuit 3 in response to signals 6Ua, 6Va and 6Wa from current controllers 6U, 6V and 6W and a 6-bit signal 7a from the decoder 7.

Next, the operation of the foregoing conventional arrangement will be described. FIG. 2 is a waveform diagram explaining the operation of the decoder 7. The decoder 7 produces the 6-bit signal 7a which identifies 60°-periods I through VI in relationship with the three line voltages eRS, eST and eTR of the power source 1 as shown. The signal 7a is made to have the bit states as shown, causing the switches 3RU, 3RV and 3RW to be nonconductive in periods I and IV, the switches 3TU, 3TV and 3TW to be nonconductive in periods II and V, and the switches 3SU, 3SV and 3SW to be nonconductive in periods III and VI. During this operation, the main circuit 3 has the respective conductive states as shown equivalently in FIGS. 3(I) through 3(VI). These equivalent circuits of the main circuit 3 are given the positive polarity for the upper input line and the negative polarity for the lower input line, and the voltage between the lines is a maximum instantaneous value of the absolute value of the three line voltages of the power source 1. Accordingly, the decoder 7 operates on the main circuit 3 to function as a 3-phase inverter that produces a d.c. voltage having a maximum instantaneous value of the absolute value of the three line voltages of the power source 1.

The current commander 4, current sensors 5U, 5V and 5W, and current controllers 6U, 6V and 6W operate to control the current of the load 2 by making the switches 3RU through 3TW conductive or nonconductive in the same way as in the usual inverter current control. For example, the current commander 4 produces the current commands iU*, iV* and iW* for 3-phase sinusoidal waves with a variable magnitude and frequency, and the current controllers 6U, 6V and 6W produce the signals 6Ua, 6Va and 6Wa for making the switches conductive during the periods depending on the differences between iU* and iU, between iV* and iV, and between iW* and iW. The signals 6Ua, 6Va and 6Wa are received by the corresponding decoders 8U, 8V and 8W, which also receive the signal 7a from the decoder 7 to cause the switches in the main circuit 3 to be conductive or nonconductive according to these input signals, so that power is supplied from the power source 1 to the load 2.

The conventional 3-phase-to-3-phase power converter arranged as described above does not control the current waveform of the 3-phase power source, resulting in the disorder of a current flow in the 60°-period in some current waveform conditions, and therefore it does not provide a satisfactory input power factor.

SUMMARY OF THE INVENTION

A primary object of this invention is to provide a 3-phase-to-3-phase power converter which overcomes the foregoing prior art deficiency.

Another object of this invention is to provide a power converter having its input power factor improved through the control of the output voltage and output current so as to provide the 3-phase sinusoidal waveform and through the control of the output waveform in compliance with the input voltage waveform.

Other objects and advantages of this invention will be more apparent from the following detailed description of the embodiment taken in conjunction with the accompanying drawings.

BRIEF DESCRIPTION OF THE DRAWINGS

FIGS. 5 through 8 are waveform diagrams used to explain the operation of the power converter shown in FIG. 4.

DESCRIPTION OF THE PREFERRED EMBODIMENT

Figure 1:
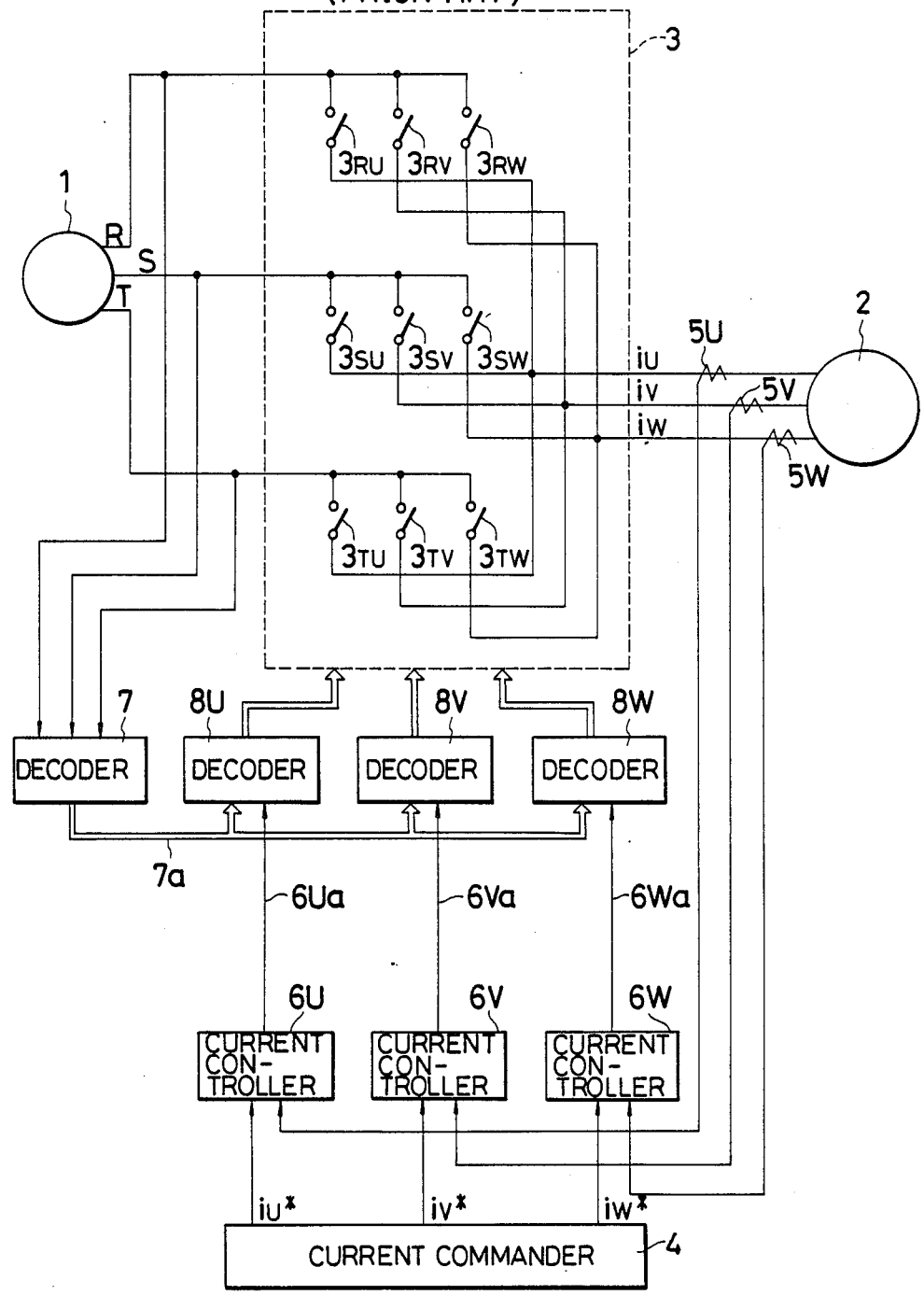
FIG. 1 is a brief block diagram of the conventional 3-phase-to-3-phase power converter.
Figure 2:
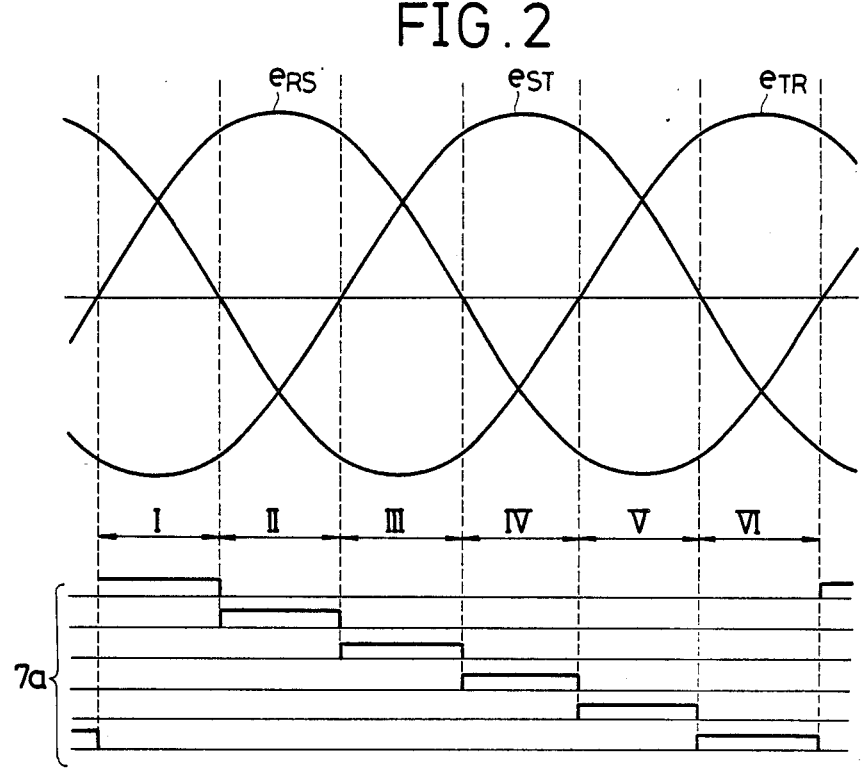
FIG. 2 is a waveform diagram showing the operation of the decoder shown in FIG. 1.
Figure 4:
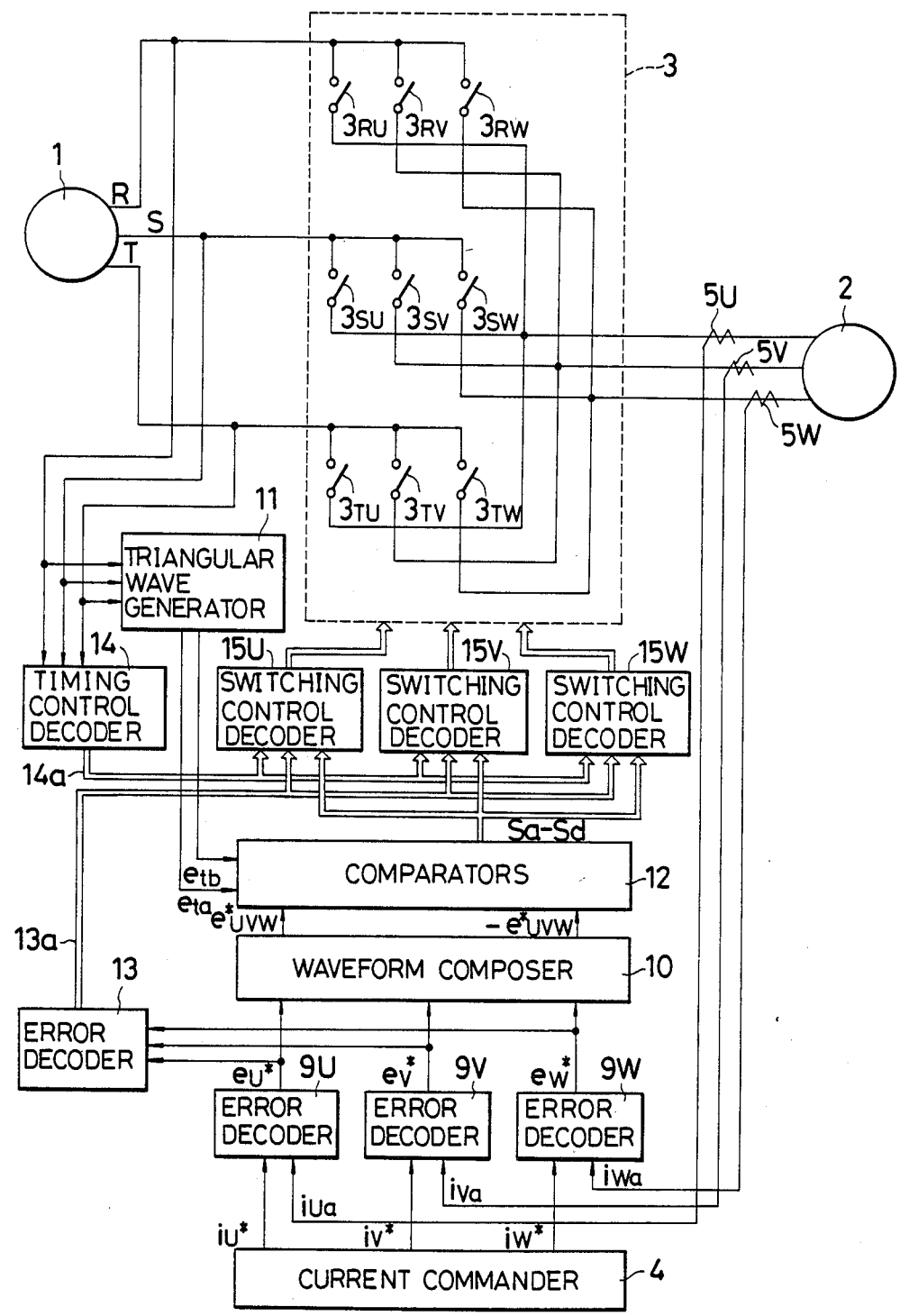
FIG. 4 is a brief block diagram showing the 3-phase-to-3-phase power converter embodying this invention.

An embodiment of this invention will now be described with reference to the drawings. In FIG. 4, where counterparts to those in FIG. 1 are referred to by the common symbols, the circuit arrangement includes three error decoders or amplifiers for the U, V and W phases for evaluating the differences between the current commands iU*, iV* and iW* from the current commander 4 and the current signals iUa, iVa and iWa provided by the current sensors 5U, 5V and 5W, and producing the amplified voltage commands eU*, eV* and eW*. Numeral 10 denotes a waveform composer which composes the voltage commands eU*, eV* and eW* into two voltage commands e*UVW and −e*UVW. Numeral 11 denotes a triangular wave generator which receives the 3-phase input voltage from the power source 1 to produce 2-phase triangular signal waves $e_{ta}$ and $e_{tb}$ for implementing pulse-width modulation for the voltage commands e*UVW and −e*UVW. Numeral 12 denotes a set of four comparators which operate to compare e*UVW with $e_{ta}$, e*UVW with $e_{tb}$, −e*UVW with $e_{ta}$, and −e*UVW with $e_{tb}$, and provide the resultant signals Sa, Sb, Sc and Sd, respectively. Numeral 13 denotes a decoder which receives the error signals e*U, e*V and e*W to produce a signal 13a locating the phase of e*U, e*V or e*W among the six 60° segments. Numeral 14 denotes a timing control decoder which receives the phase voltages eR, eS and eT of the power source 1 to produce a signal 14a locating the phase of eR, eS or eT among the six 60° segments. 15U, 15V and 15W are switching control decoders which receive the signals Sa–Sd from the comparator 12, the signals 13a from the decoder 13 and the signal 14a from the decoder 14 to determine the activation or deactivation of the switches 3RU through 3TW.

Figure 5B:
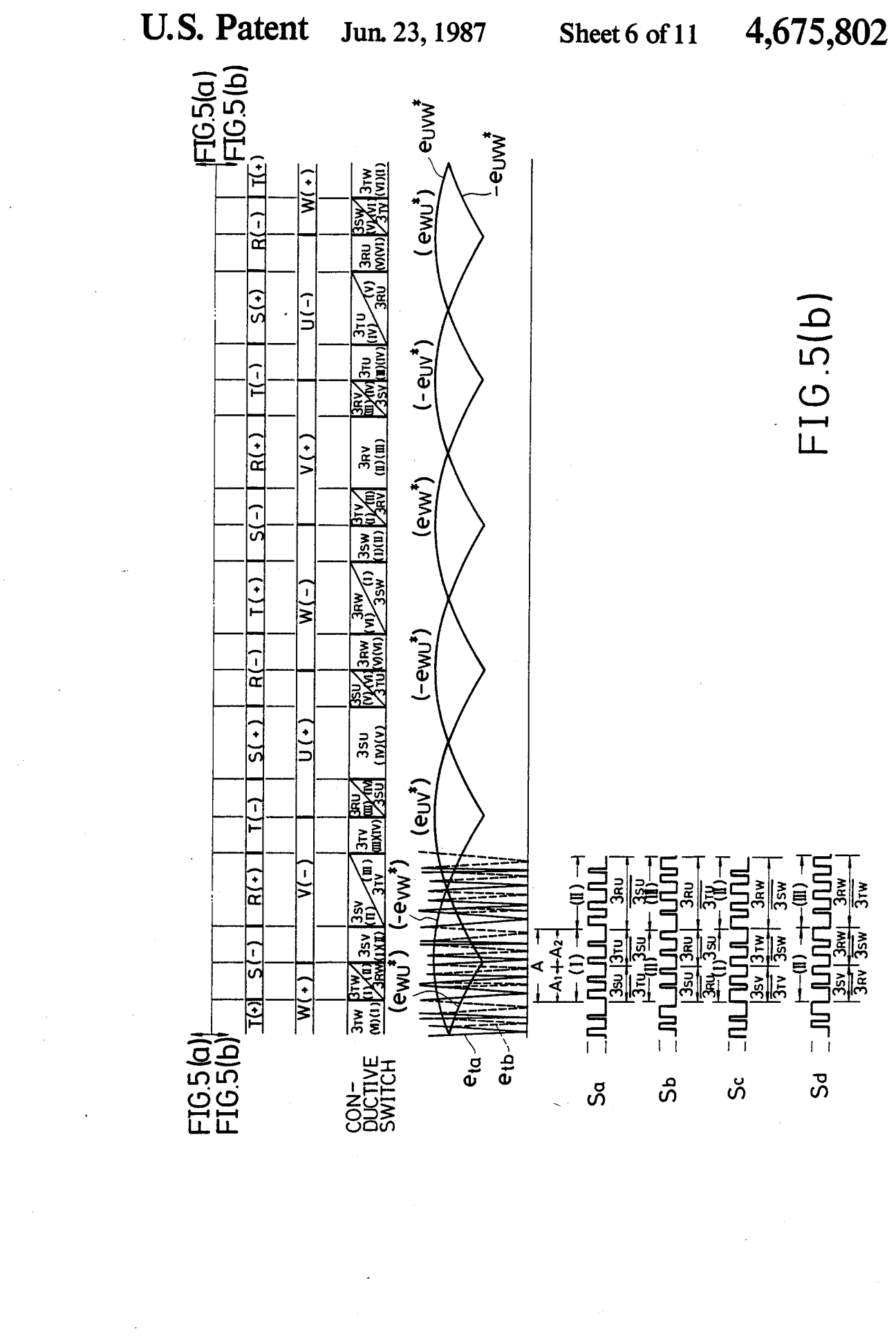

Next, the operation of the embodiment will be described with reference to FIGS. 4 through 8. It is assumed that the current commander 4 provides the sinusoidal command signals iU*, iV* and iW*. Further assuming that the currents detected by the current sensors 5U, 5V and 5W are also sinusoidal, the error amplifiers 9U, 9V and 9W also produce the sinusoidal outputs e*U, e*V and e*W as shown in FIG. 5. The waveform composer 10 composes the signals e*U, e*V and e*W to produce the voltage commands e*UVW and −e*UVW for the intended waveform, where e*UVW is the envelope of the positive peak voltages of the line voltages e*UV, e*VW and e*WU derived from e*U, e*V and e*W, while −e*UVW is the envelope of the negative peak voltages with its polarity being inverted. The reason for producing the voltage commands e*UVW and −e*UVW is that one of the switches 3RU–3TW is always turned on at the peak of the absolute value of e*U, e*V and e*W. Namely, it is intended to produce a pulse-width modulated voltage in correspondence to the voltage command e*UVW or −e*UVW.

Figure 6:
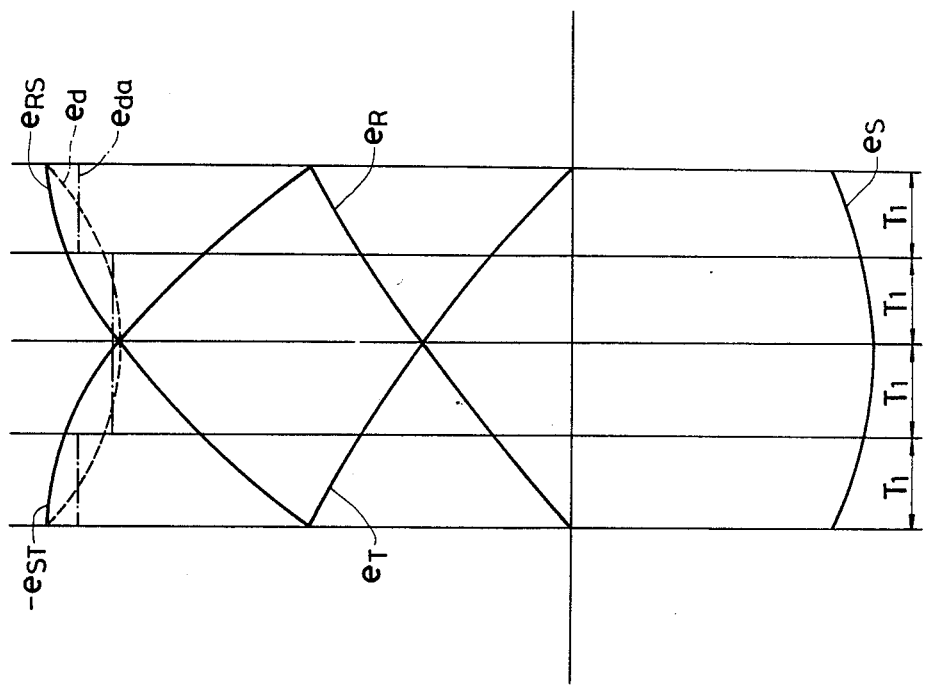

FIG. 6 is a waveform diagram showing a 60°-period of the line voltage eRS of the power source 1 extracted from FIG. 5. The voltages eR, eS, eT, eRS and −eST shown in the figure are expressed in equations (1) as follows:

$$\left.\begin{aligned} e_R &= \sqrt{2}\, E \sin\theta \\ e_S &= \sqrt{2}\, E \sin\left(\theta - \frac{2\pi}{3}\right) \\ e_T &= \sqrt{2}\, E \sin\left(\theta + \frac{2\pi}{3}\right) \\ e_{RS} &= \sqrt{6}\, E \sin\left(\theta + \frac{\pi}{6}\right) \\ -e_{ST} &= \sqrt{6}\, E \sin\left(\theta + \frac{\pi}{2}\right) \end{aligned}\right\} \quad (1)$$

where E is the effective value of the phase voltage of the power source 1, and $\theta$ has a range of $0 \leq \theta \leq \pi/3$. In FIG. 6, the voltage $e_d$ shown by the dashed line can be expressed in terms of eR, eT, eRS and −eST as follows:

$$e_d = \frac{1}{e_R + e_T}(e_{RS} \times e_R - e_{ST} \times e_T) \qquad (2)$$

$$= \frac{3\sqrt{2}\, E}{2 \sin\left(\theta + \frac{\pi}{3}\right)}$$

The following is the reason for the introduction of $e_d$. If a pulse-width modulation inverter receiving a d.c. voltage of $e_d$ produces a sinusoidal output current, the input d.c. current $i_d$ is expressed as follows:

$$i_d = k_1 \frac{2 \sin\left(\theta + \frac{\pi}{3}\right)}{3\sqrt{2}\, E} \qquad (3)$$

+ Side band components of PWM frequency where $k_1$ is a constant.

If the PWM frequency is sufficiently high, equation (3) can be approximated as follows:

$$i_d \approx k_1 \frac{2 \sin\left(\theta + \frac{\pi}{3}\right)}{3\sqrt{2}\, E} \qquad (4)$$

On the other hand, the signal eS in the period shown in FIG. 3 can also be expressed in a modified form as follows:

$$e_S = -\sqrt{2}\, E \sin\left(\theta + \frac{\pi}{3}\right) \qquad (5)$$

Accordingly, by introducing the voltage $e_d$ while taking the eS in this period for the negative side, the power source 1 has its S-phase current iS being $-i_d$, and the eS and current iS have a common phase. In order to obtain the voltage $e_d$, it is necessary to sum eRS and −eST (i.e., eTS) with a ratio of eR to eT as can be seen from equation (2), and it is implemented practically by way of splitting that short period by the ratio of eR to eT and applying each signal in each given time slot. In consequence, the currents iR and iT are induced by the division of the current $i_d$ in the ratio of $e_R$ to $e_T$. Using equation (4) for the current $i_d$ again, the currents iR and iT can approximated as follows:

$$i_R \approx k_1 \frac{2\sin\theta}{3\sqrt{2}\,E}$$
$$i_T \approx k_1 \frac{2\sin\left(\theta + \frac{2\pi}{3}\right)}{3\sqrt{2}\,E} \quad (6)$$

Accordingly, iR and eR have a common phase, and iT and eT also have a common phase. In conclusion, by obtaining $e_d$ as expressed by equation (2), the power source 1 has the power factor substantially equal to unity. This is the reason for introducing $e_d$.

Next, the practical operation of evaluating the $e_d$ expressed in equation (2) will be described. In the above description of the division of a short period by eR to eS so as to use eRS and −eST for the given time slots as the $e_d$, the short period is defined here to be a quartered time length T1 (15°) of a 60°-period of eR as shown in FIG. 6, and an average voltage $e_{da}$ of $e_d$ in each time slot T1 will be treated.

Figure 3I:
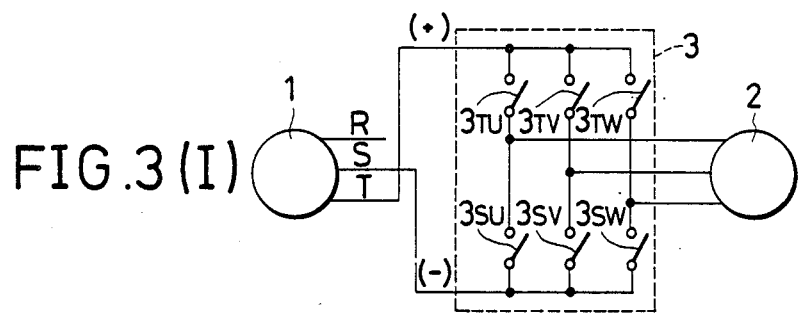
FIGS. 3(I) through 3(VI) are equivalent circuit diagrams showing the operating modes of the circuit arrangement shown in FIG. 1.
Figure 7:
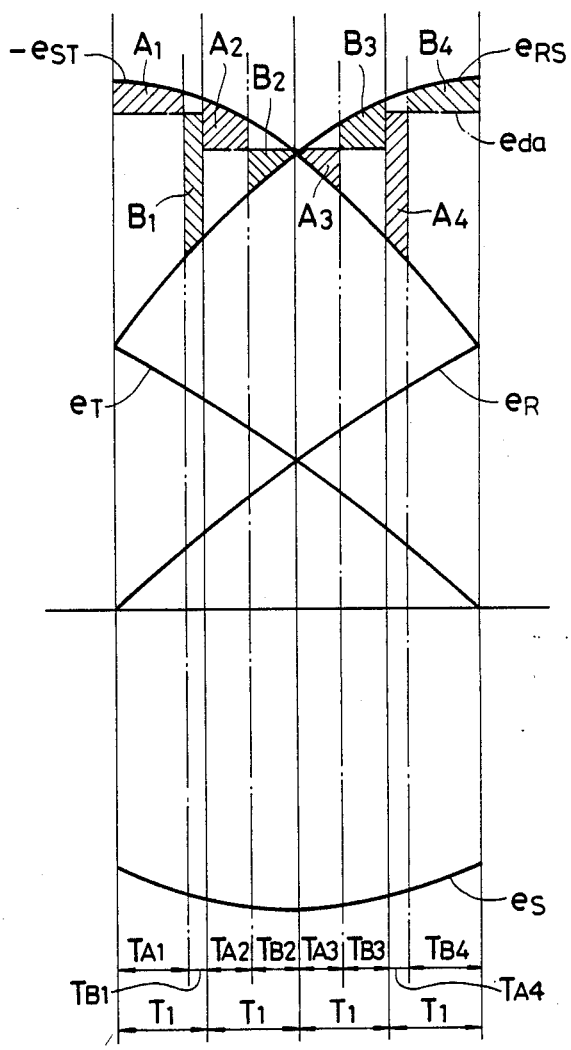

FIG. 7 is a waveform diagram explaining the concept of evaluating $e_{da}$, in which A1 is a section enclosed by −eST and $e_{da}$ and B1 is a section enclosed by eRS and $e_{da}$, with the time slot T1 being split into TA1 and TB1 so that the A1 and B1 have the equal area. Taking voltage −eST in the period TA1 and eRS in TB1, the average voltage in the time slot becomes $e_{da}$. This concept is equally applied to the remaining combinations of A2 and B2, A3 and B3, and A4 and B4. The main circuit 3 is operated as shown in FIG. 3(I) during the periods TA1, TA2, TA3 and TA4, while the circuit is operated as shown in FIG. 3(II) during the periods TB1, TB2, TB3 and TB4. The operation of the circuit 3 in other periods than those shown in FIGS. 6 and 7 is identical, and it is totally shown in FIGS. 4 and 5.

The triangular wave used to evaluate the pulse-width modulated sinusoidal output voltage while switching the switches 3RU–3TW in the short period is produced in the following way. In case the d.c. voltage includes an a.c. component as in $e_{da}$, the sinusoidal PWM inverter causes the PWM triangular wave to have the amplitude varied in proportion to $e_{da}$, while the PWM voltage command is left unchanged.

Figure 8:
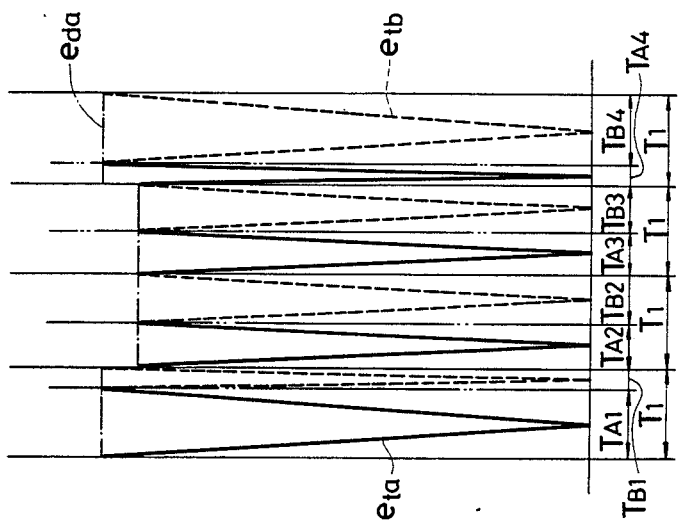

FIG. 8 is a waveform diagram showing the PWM rectangular wave varying in its amplitude in proportion to the $e_{da}$. The time slots T1, TA1–TA4 and TB1–TB4 are the same as those shown in FIG. 7. The rectangular wave consists of a signal $e_{ta}$ shown by the solid line and a signal $e_{tb}$ shown by the dashed line, the former being generated in the periods TA1, TA2, TA3 and TA4, while the latter being generated in the periods TB1, TB2, TB3 and TB4.

The signals $e_{ta}$ and $e_{tb}$ are generated by the triangular wave generator 11. The comparators 12 compare the magnitudes of the voltage commands e*UVW and −e*UVW produced by the waveform composer 10 with the signals $e_{ta}$ and $e_{tb}$, respectively, and produces the signals Sa–Sd for activating or deactivating the switches 3RU–3TW as shown in FIG. 5. As can be seen from the figure, Sa is the result of comparison of e*UVW with $e_{ta}$, Sb is that of e*UVW with $e_{tb}$, Sc is that of −e*UVW with $e_{ta}$, and Sd is that of −e*UVW and $e_{tb}$. The signals Sa–Sd are given a high level when e*UVW or −e*UVW are greater than $e_{ta}$ or $e_{tb}$ a low level when e*UVW or −e*UVW are less than $e_{ta}$ or $e_{tb}$. Which of the switches 3RU–3TW are activated or deactivated in response to these high or low level signals is determined by the outputs of the decoders 13 and 14. The decoder 14 provides a signal 14a for identifying which one of eR, eS and eT of the power source 1 is highest in the absolute value and also identifying its polarity at that time point. The decoder 13 provides a signal 13a for identifying which one of e*U, e*V and e*W from the error amplifiers 9U, 9V and 9W is highest in the absolute value and also identifying its polarity at that time point. The decoders 15U, 15V and 15W receive the signals Sa–Sd, 13a and 14a from the comparator 12, decoder 13 and decoder 14 to determine which of the switches 3RU–3TW are to be activated.

The determinating operation will be described for a period A in FIG. 5. In period A, the power source 1 has the highest absolute phase voltage in eS in negative polarity. This is the period shown in FIG. 6, and the main circuit 3 has the operating modes shown in FIGS. 3(I) and 3(II) in this period. In the former half A1 of this period, the highest absolute value among the outputs of the error amplifiers 9U, 9V and 9W is e*W with positive polarity, while in the latter half period A2, the highest one is e*V with negative polarity. In the operating mode of the main circuit 3 shown in FIG. 3(I) in period A1, at least the switch 3TW on the positive side among the switches 3RU–3TW related to the W-phase is made conductive because of positive polarity of e*W, and in the operating mode shown in FIG. 3(II), at least the switch 3RW on the positive side among those related to the W-phase is activated because of positive polarity of e*W. The voltage on the load 2 is controlled on the basis of the voltages at the switches 3TW and 3RW. A high Sa signal from the comparator 12 turns on the switch 3SU, while the signal at low level turns on the switch 3TU. Switches attached with symbol "‾", e.g., 3TU, in FIG. 5 signifies that it is turned on when the signals Sa–Sd are high. A high Sb signal from the comparators 12 turns on the switch 3SU, and the signal at low level turns on the switch 3RU. A high Sc signal from the comparators 12 turns on the switch 3SV, and the signal at low level turns on the switch 3TV. Finally, a high Sd signal from the comparators 12 turns on the switch 3SV, and the signal at low level turns on the switch 3RV.

Figure 3:
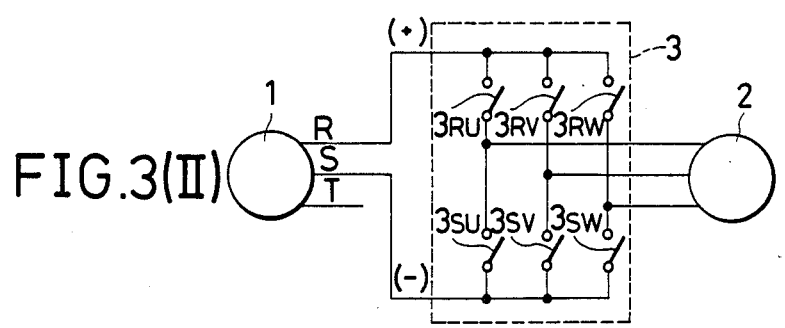
Figure 3:
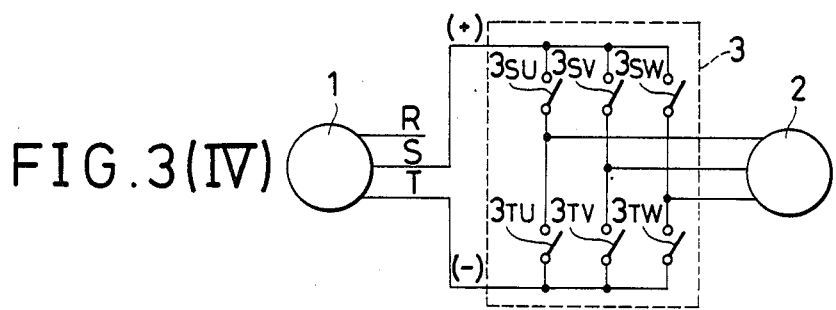
Figure 3V:
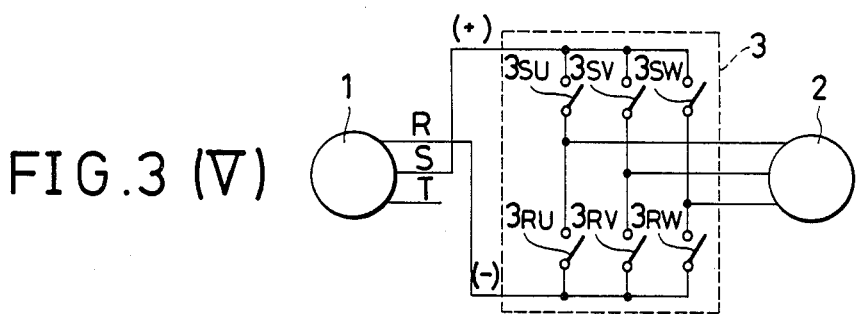
Figure 3:
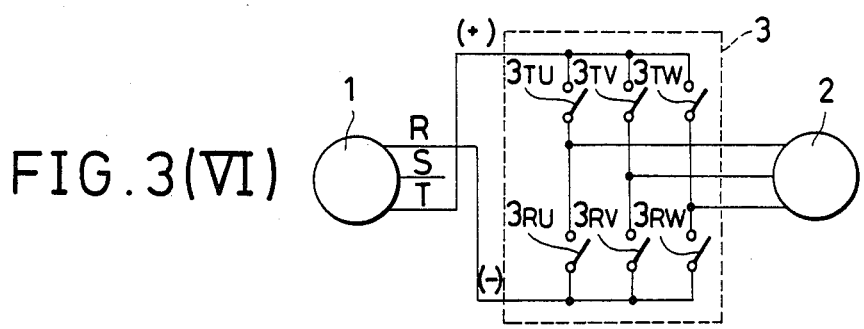

In the latter half period A2 in either operating mode shown in FIG. 3(I) or 3(II), the switch 3SV on the negative side (since e*V is negative) among the switches 3RU–3TW related to the V-phase is turned on, and the activation or deactivation of the remaining switches 3RU–3TW for the U and W phases is determined on the basis of the voltage at the switch 3SV, as in the case of the period A1. The decoders 15U, 15V and 15W in the remaining periods determine switches to be turned on from the signals from the comparators 12, decoder 13 and decoder 14 in the same way as described above.

Although in the above embodiment with the intention of controlling the output voltage and current of the 3-phase-to-3-phase power converter while improving its input power factor, a 60°-period has been shown in FIGS. 6 through 8 for the requirement of having at least once two of the main circuit operating modes shown in FIGS. 3(I)–3(VI) in a 30° period of the power source voltage, the symmetric waveforms with respect to the center at 30° allows the period of 30° instead of 60°, and furthermore, it is not limited to have two operating modes twice in the 30°-period as shown in FIGS. 7 or 8. The larger the number of times of operating modes, the less low-order harmonics are included in the input and output current waveforms of the 3-phase-to-3-phase power converter, i.e., better current waveforms.

Although in the above embodiment elements of determining the activation or deactivation of the switches 3RU-3TW include the PWM element for comparing the triangular wave with part of the sinusoidal wave, the pulse-width modulation may be of the type dealing with the phase or amplitude of the sinusoidal wave with the similar resultant effect to the case of the foregoing embodiment.

Figure 9:
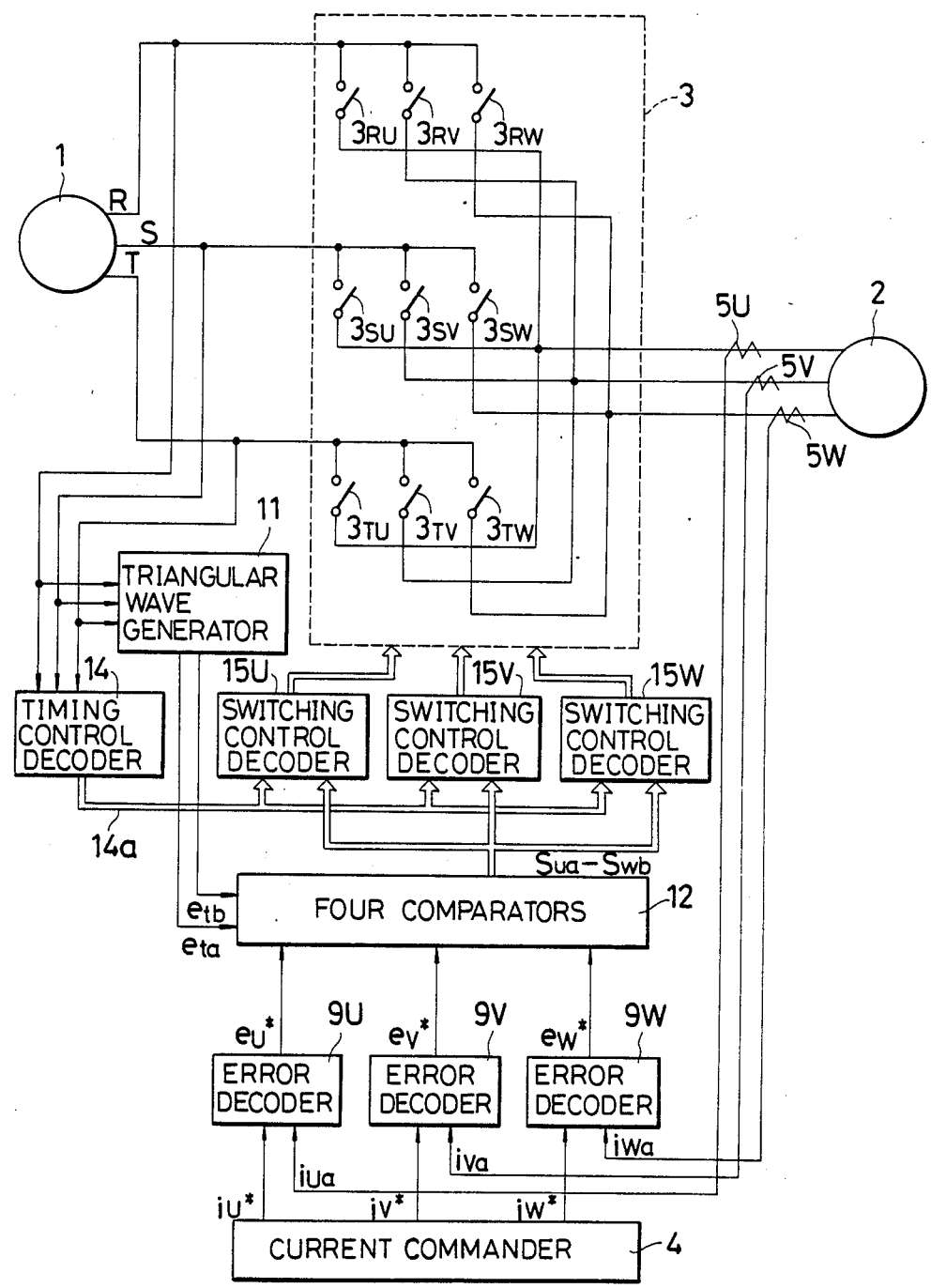
FIG. 9 is a brief block diagram showing another embodiment of the 3-phase-to-3-phase power converter according to this invention.
Figure 10:
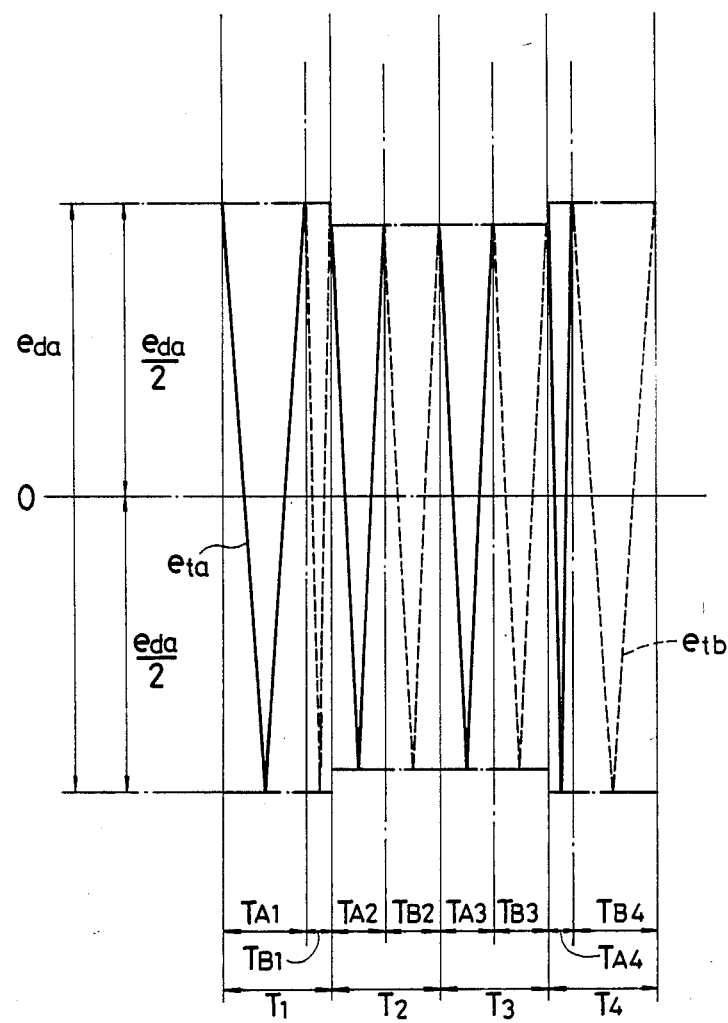
FIGS. 10 and 11 are waveform diagrams used to explain the operation of the power converter shown in FIG. 9.
Figure 11:
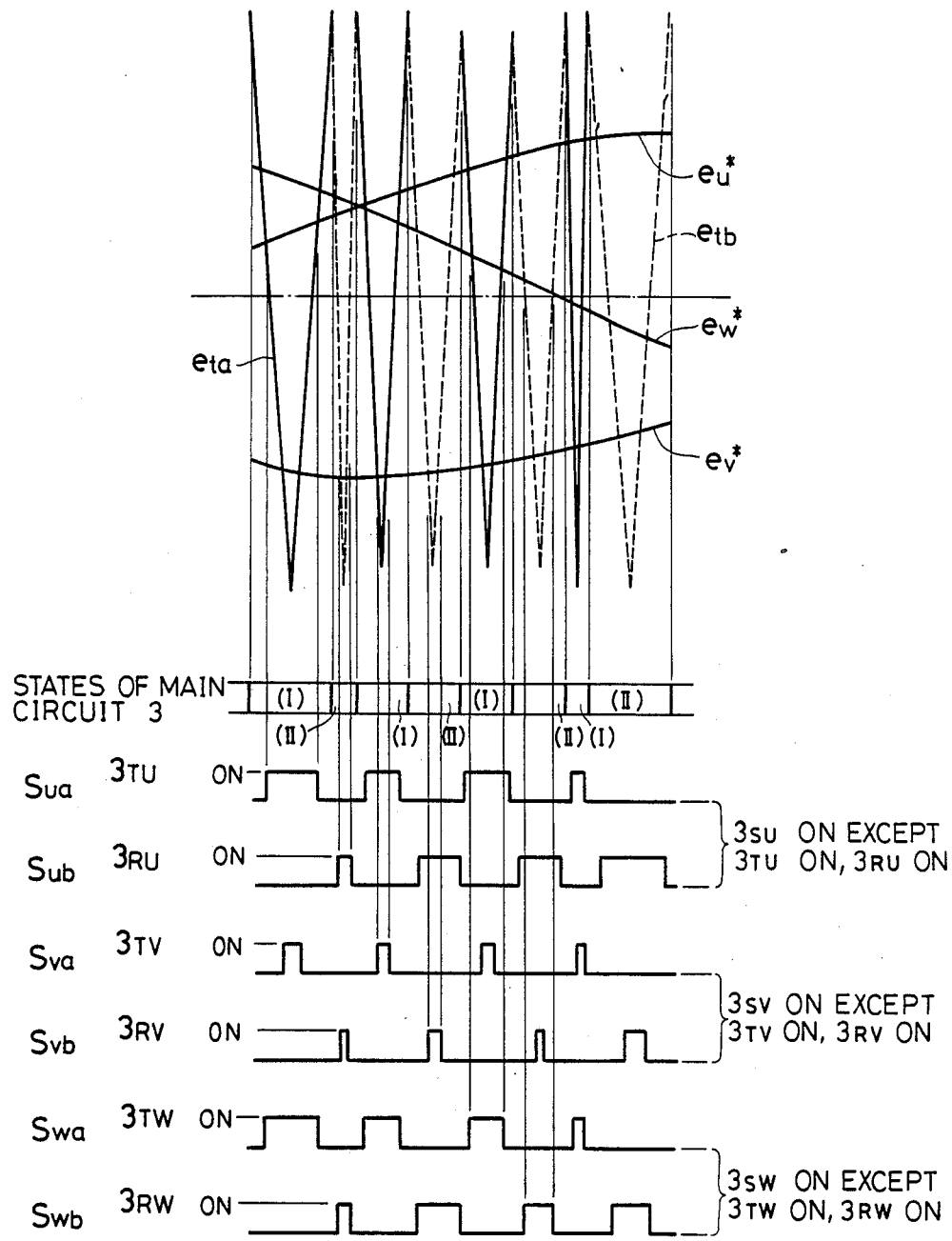

Hereinafter there will be explained only the parts of FIG. 9 different from those of FIG. 4. In FIG. 9, the signals $e_{ta}$, $e_{tb}$ of the triangular wave generator 11 are outputted as modulation signals as shown in FIG. 10. The waves of FIG. 10 are shown in the same period as those of FIG. 8. In FIG. 10, the point 0 is the center, and $e_{da}$ is divided into $e_{da}/2$, and thereby modulation signals $e_{ta}$, $e_{tb}$ are produced as the signals with the amplitude $e_{da}/2$. The comparators 12 compare the voltage commonads eU*, eV* and eW* to be applied to the load 2 with the modulation signals $e_{ta}$ and $e_{tb}$ so as to output signals $S_{ua}$-$S_{wb}$ shown in FIG. 11. The signals $S_{ua} \cdot S_{ub}$($S_{va} \cdot S_{vb}$, $S_{wa} \cdot S_{wb}$) function to turn on or off the switches 3RU, 3SU, 3TU (3RV·3SV·3TV, 3RW·3SW·3TW) connected to the phase U(V,W) of the load 2. The output 14a of the decoder 14 and the signals $S_{ua}$-$S_{wb}$ are inputted to the decoders 15U, 15V and 15W, so as to discriminate which switch should be made ON among these switches.

As described above, the present invention of controlling the output voltage and current of the 3-phase-to-3-phase power converter is also intended to control the phase of the input current, whereby a 3-phase-to-3-phase power converter with satisfactory input power factor can effectively be accomplished.

What is claimed is:

1. A three-phase-to-three-phase power converter comprising:
   command means for generating three phase command voltages to control load voltages applied to a three phase load; error amplifying means connected to said command means and the load for generating difference signals of said command voltages and said load voltages; waveform composer means responsive to said difference signals for producing two-phase mono-polarized command voltages having a phase difference of 180° from each other;
   means for deriving modulation signals from a voltage of a power source;
   comparator means for producing pulse-width-modulated signals from said mono-polarized command voltages and said modulation signals;
   a timing control decoder which iteratively produces timing control signals that are active in respective time segments of a plurality of time segments created by division of one period of said power source voltage;
   a plurality of switches disposed on lines between said power source and said load; and
   switching control decoder means having inputs connected to said comparator means and said timing control decoder for applying signals to said switches so as to render said switches conductive selectively in compliance with said pulse-width-modulated signals and said timing control signals.

2. A three-phase-to-three-phase power converter comprising:
   command means for generating three-phase command voltages to control load voltages applied to a three-phase load;
   means for deriving modulation signals from a voltage of a power source;
   comparator means for producing pulse-width-modulated signals from said command voltages and said modulation signals;
   a timing control decoder which iteratively produces timing control signals that are active in respective time segments of a plurality of time segments created by division of one period of said power source voltage;
   a plurality of switches disposed on lines between said power source and said load; and
   switching control decoder means having inputs connected to said comparator means and said timing control decoder for applying signals to said switches so as to render said switches conductive selectively in compliance with said pulse-width-modulated signals and said timing control signals.

3. A power converter according to claim 2 wherein said modulation signal deriving means includes a triangular waveform generator which is disposed between said power source and said comparator means, and adapted to produce two-phase triangular waves used for pulse-width modulation of said command voltages.

* * * * *